United States Patent
Byun

(10) Patent No.: US 12,242,749 B2
(45) Date of Patent: Mar. 4, 2025

(54) MEMORY CONTROLLER CONTROLLING SYNCHRONIZATION OPERATION BASED ON FUSED LINKED LIST AND OPERATING METHOD THEREOF

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/660,232

(22) Filed: May 10, 2024

(65) Prior Publication Data

US 2024/0289043 A1    Aug. 29, 2024

Related U.S. Application Data

(63) Continuation of application No. 17/728,921, filed on Apr. 25, 2022, now Pat. No. 12,019,891.

(30) Foreign Application Priority Data

Oct. 7, 2021    (KR) .................. 10-2021-0132859

(51) Int. Cl.
*G06F 3/06*      (2006.01)
*G06F 16/901*    (2019.01)

(52) U.S. Cl.
CPC .......... *G06F 3/0644* (2013.01); *G06F 3/0604* (2013.01); *G06F 3/0673* (2013.01); *G06F 16/9024* (2019.01)

(58) Field of Classification Search
None
See application file for complete search history.

(56) References Cited

U.S. PATENT DOCUMENTS

| | | | |
|---|---|---|---|
| 10,228,869 B1 | 3/2019 | Nakibly et al. | |
| 10,599,477 B1 | 3/2020 | Aral et al. | |
| 2003/0056034 A1 | 3/2003 | Olds et al. | |
| 2006/0095741 A1* | 5/2006 | Asher | G06F 9/3858 712/225 |
| 2019/0227737 A1* | 7/2019 | Gilsdorf | G06F 3/0604 |
| 2021/0200582 A1 | 7/2021 | Wei | |

FOREIGN PATENT DOCUMENTS

KR    10-2020-0017120 A    2/2020

* cited by examiner

*Primary Examiner* — Stephanie Wu
(74) *Attorney, Agent, or Firm* — IP & T GROUP LLP

(57) ABSTRACT

Embodiments of the present disclosure relate to a memory controller and operating method thereof. According to embodiments of the present disclosure, the memory controller may generate a fused linked list which includes information of a plurality of write commands received from a host and a plurality of synchronization commands requesting a synchronization operation, and control the synchronization operation for one or more of the plurality of write commands based on the fused linked list.

12 Claims, 15 Drawing Sheets

MEMORY CONTROLLER CONTROLLING SYNCHRONIZATION OPERATION BASED ON FUSED LINKED LIST AND OPERATING METHOD THEREOF

CROSS-REFERENCES TO RELATED APPLICATION

The present application is a continuation of U.S. patent application Ser. No. 17/728,921 filed on Apr. 25, 2022, which claims priority under 35 U.S.C. 119(a) to Korean patent application number 10-2021-0132859 filed on Oct. 7, 2021, which is incorporated herein by reference in its entirety.

TECHNICAL FIELD

Various embodiments of the present disclosure generally relate to a memory controller controlling a synchronization operation based on a fused linked list and an operating method thereof.

BACKGROUND

A memory system includes a data storage device that stores data on the basis of a request from a host, such as a computer, servers, a smartphone, a tablet PC, or other electronic devices. The examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling a memory device. The memory controller may receive a command from the host and, on the basis of the received command, may execute the command or control read/write/erase operations on the memory devices in the memory system. The memory controller may be used to execute firmware operations for performing a logical operation for controlling such operations.

The memory system may receive a write command, which is a command requesting data to be written, from a host. And the memory system may receive a synchronize command, which is a command requesting a synchronize operation, from the host.

Synchronizing a write command means completely storing write data requested by the write command in the memory device of the memory system. When the synchronization operation for the write command is executed, it is guaranteed that the write data has been stored in the memory system. The memory system may execute a flush operation or a force unit access (FUA) operation to execute synchronization for the write command.

SUMMARY

Various embodiments of the present disclosure are directed to a memory controller and operating method thereof, capable of efficiently managing a plurality of write commands and a plurality of synchronization commands received from the host.

In one aspect, embodiments of the present disclosure may provide a memory controller generating a fused linked list which includes information of a plurality of write commands received from a host and a plurality of synchronization commands requesting a synchronization operation, wherein the synchronization operation is an operation for completing storage of data in a memory device, the data being requested to be written by one or more of the plurality of write commands, and controlling the synchronization operation for one or more of the plurality of write commands based on the fused linked list.

The fused linked list may include a head node indicating a start position of the fused linked list, a plurality of write command nodes each of which corresponds to one of the plurality of write commands, and a plurality of synchronization command nodes each of which corresponds to one of the plurality of synchronization commands.

In another aspect, embodiments of the present disclosure may provide a method for operating the memory controller including: generating a fused linked list which includes information of a plurality of write commands received from a host and a plurality of synchronization commands requesting a synchronization operation, wherein the synchronization operation is an operation of completing storage of data in a memory device, the data being requested to be written by one or more of the plurality of write commands, and controlling the synchronization operation for one or more of the plurality of write commands based on the fused linked list.

The fused linked list may include a head node indicating the start position of the fused linked list, a plurality of write command nodes each of which corresponds to one of the plurality of write commands, and a plurality of synchronization command nodes each of which corresponds to one of the plurality of synchronization commands.

According to embodiments of the disclosed technologies, it is possible to manage a plurality of write commands and a plurality of synchronization commands received from the host efficiently.

DETAIL DESCRIPTION OF THE EMBODIMENTS

Figure 1:
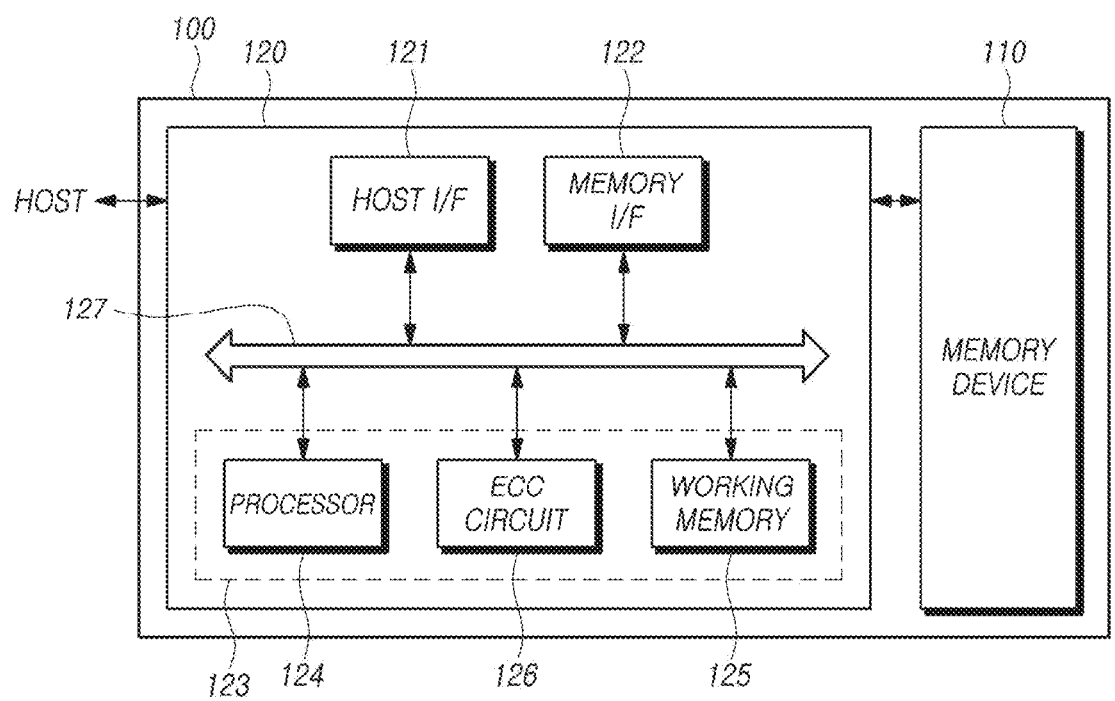
FIG. 1 is a schematic diagram illustrating a configuration of a memory system based on an embodiment of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present disclosure are described below in more detail with reference to the accompanying drawings. However, the present disclosure may be embodied in different forms and variations, and should not be construed as being limited to the embodiments set forth herein. Rather, the described embodiments are provided so that this disclosure will be thorough and complete, and will fully convey the present invention to those skilled in the art to which this disclosure pertains. Throughout this disclosure, like reference numerals refer to like parts throughout the various figures and embodiments of the present disclosure.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

When implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a diagram illustrating the schematic configuration of a memory system 100 based on an embodiment of the present disclosure.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (SU-RAM).

The memory device 110 may be implemented in a three-dimensional array structure. Some embodiments of the present disclosure are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface (memory I/F) 122, a control circuit 123, and a host interface (host I/F) 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/ correction circuit (ECC circuit) 126 and the like.

The processor 124 may control the overall operation of the memory controller 120. The processor 124 may perform a logical operation. The processor 124 may communicate with the host HOST through the host interface 121. The processor 124 May communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which May be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. That is, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one of a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the present disclosure, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check whether an error correction operation is needed on the next sector. Upon completion of the error detection and correction operations on all read data in this manner, the error detection/correction circuit 126 may acquire information as to which sector is deemed uncorrectable in the read data. The error detection/ correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
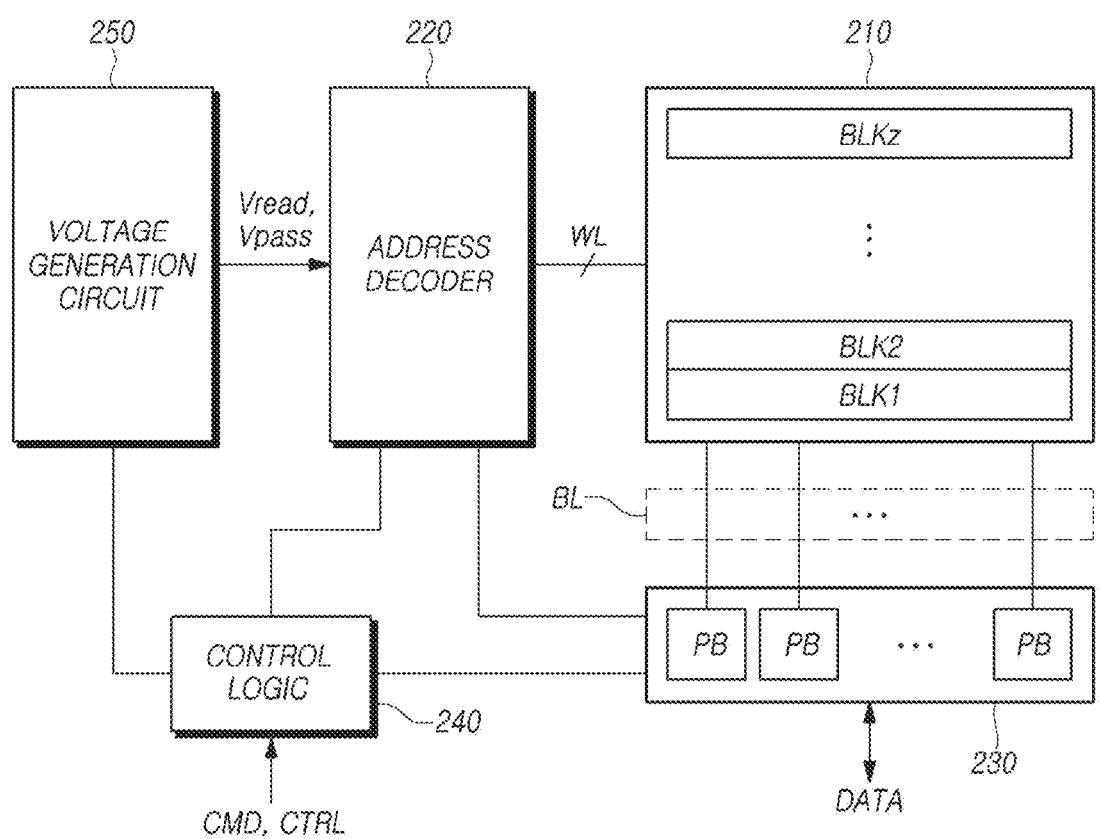
FIG. 2 is a block diagram schematically illustrating a memory device based on an embodiment of the present disclosure.

FIG. 2 is a block diagram schematically illustrating a memory device 110 based on an embodiment of the present disclosure.

In some implementations, the memory device 110 based on an embodiment of the present disclosure may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested May include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) May be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
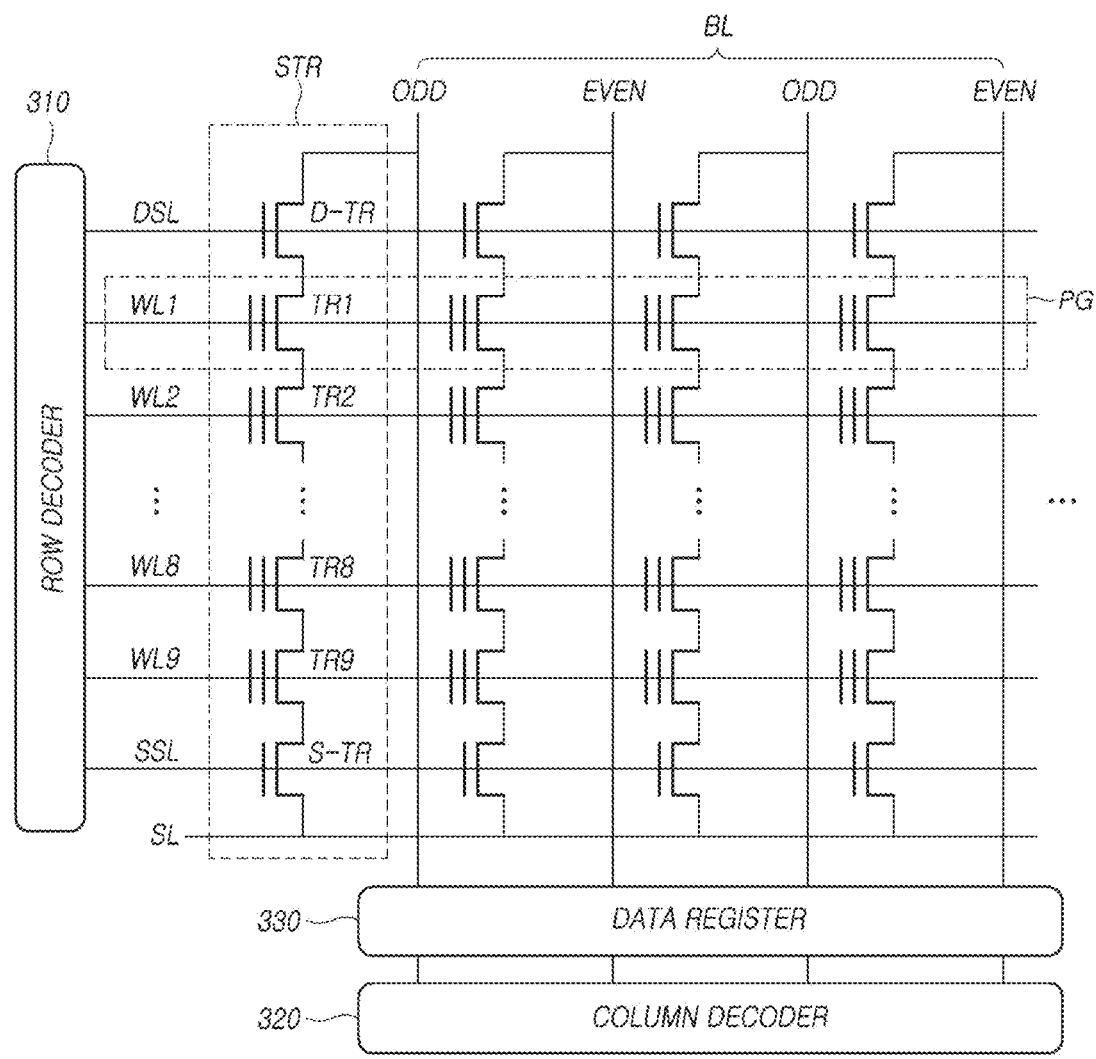
FIG. 3 is a diagram illustrating a structure of word lines and bit lines of a memory device based on an embodiment of the present disclosure.

FIG. 3 is a diagram illustrating a structure of word lines WL and bit lines BL of a memory device 110 based on an embodiment of the present disclosure.

Referring to FIG. 3, the memory device 110 has a core area in which memory cells MC are arranged, and an auxiliary area (the remaining area other than the core area) to include circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of an odd-numbered bit line and an even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch circuit that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
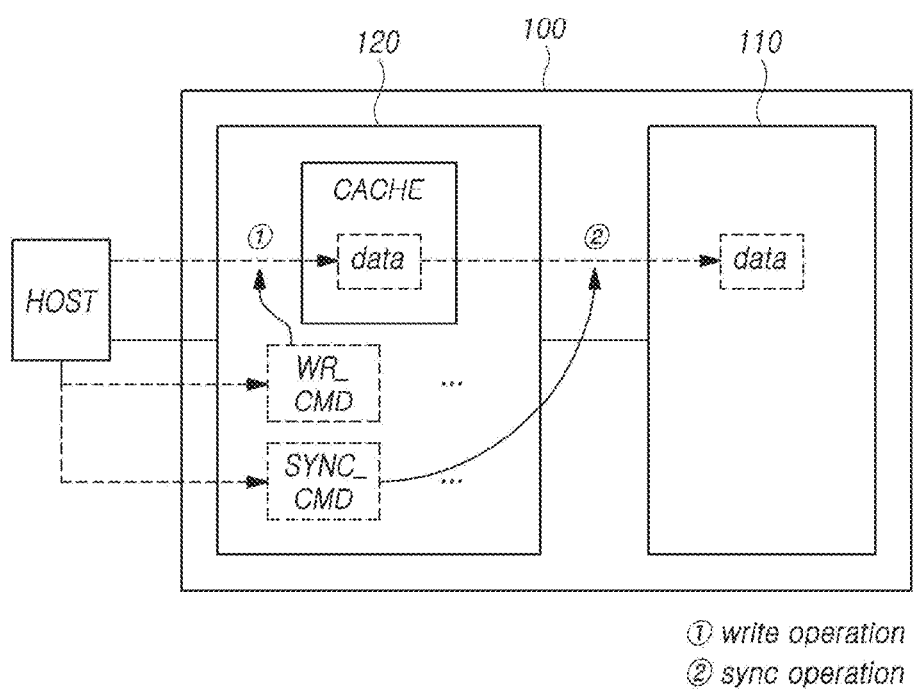
FIG. 4 is a diagram illustrating a schematic operation of the memory system based on an embodiment of the present disclosure.

FIG. 4 is a diagram illustrating a schematic operation of the memory system 100 based on an embodiment of the present disclosure.

Referring to FIG. 4, the memory system 100 may include a memory device 110 and a memory controller 120.

The memory device 110 may store data requested by a host HOST to write.

The memory controller 120 may control the memory device 110 to store data requested by the host HOST to write in the memory device 110.

The memory controller 120 may receive a write command WR_CMD and a synchronization command SYNC_CMD from the host HOST.

The write command WR_CMD is a command requesting data to be written. And the synchronization command SYNC_CMD is a command requesting a synchronization operation, wherein the synchronization operation is an operation completing storage of data requested to be written by write command WR_CMD, received from the host HOST, in the memory device 110. In this case, the synchronization command SYNC_CMD may request synchronization operation for one or more of write commands WR_CMD.

When the memory controller 120 receives the write command WR_CMD from the host HOST, the memory controller 120 may first store the data requested by the write command WR_CMD inside of the memory controller 120 before storing the data in the memory device 110. For example, the memory controller 120 may store the data requested by the write command WR_CMD in the cache CACHE in the memory controller 120 "①".

The cache CACHE may be a volatile memory or a non-volatile memory that can temporarily store data. The cache CACHE may be, for example, the aforementioned working memory 125. The data stored in the cache CACHE, for example, may be periodically written to the memory device 110 or written to the memory device 110 when a specific condition is satisfied. When the operation of writing data stored in the cache CACHE to the memory device 110 is completed, the corresponding data may be removed from the cache CACHE.

When the memory controller 120 receives the synchronization command SYNC_CMD from the host HOST, the memory controller 120 may write the data, which is requested by the write command WR_CMD corresponding to the synchronization command SYNC_CMD and stored in the cache CACHE, to the memory device 110 "②".

However, when the data requested by the write command WR_CMD corresponding to the synchronization command SYNC_CMD has already been written to the memory device 110, the memory controller 120 may determine that the synchronization operation for the corresponding data has already been completed.

As described above, in the embodiments of the present disclosure, the memory system 100 may receive a plurality of write commands WR_CMD and a plurality of synchronization command SYNC_CMD from the host HOST. Hereinafter, this will be described in detail in FIG. 5.

Figure 5:
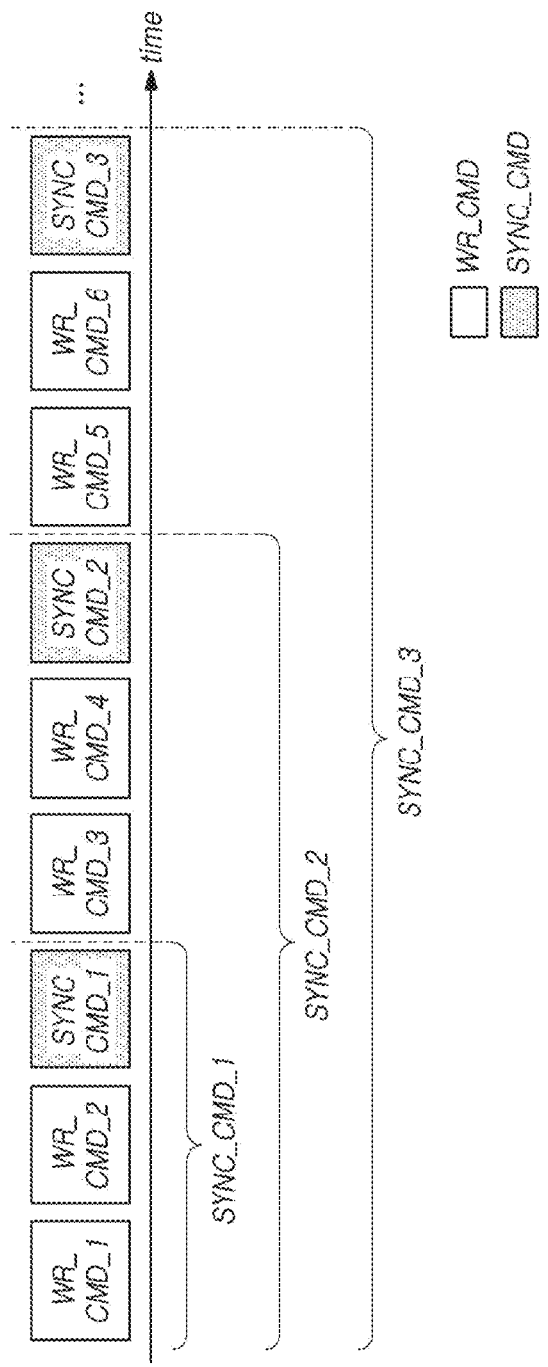
FIG. 5 is a diagram illustrating a memory controller receiving a plurality of write commands and a plurality of synchronization commands from the host based on an embodiment of the present disclosure.

FIG. 5 is a diagram illustrating a memory controller 120 receiving a plurality of write commands WR_CMD and a plurality of synchronization commands SYNC_CMD from the host based on an embodiment of the present disclosure.

Referring to FIG. 5, the memory system 100 may receive a plurality of write commands WR_CMD_1, WR_CMD_2, WR_CMD_3, WR_CMD_4, WR_CMD_5, WR_CMD_6, . . . and a plurality of synchronization commands SYNC_CMD_1, SYNC_CMD_2, SYNC_CMD_3, . . . . Each of the plurality of synchronization commands SYNC_CMD_1, SYNC_CMD_2, SYNC_CMD_3, . . . may request a synchronization operation for one or more of the plurality of write commands WR_CMD_1, WR_CMD_2, WR_CMD_3, WR_CMD_4, WR_CMD_5, WR_CMD_6, . . . .

The first synchronization command SYNC_CMD_1 is a command requesting synchronization operation for the first write command WR_CMD_1 and the second write command WR_CMD_2 among the plurality of write commands WR_CMD_1, WR_CMD_2, WR_CMD_3, WR_CMD_4, WR_CMD_5, WR_CMD_6, . . . .

The second synchronization command SYNC_CMD_2 is a command requesting synchronization operation for the first write command WR_CMD_1, the second write command WR_CMD_2, the third write command WR_CMD_3 and the fourth write command WR_CMD_4 among the plurality of write commands WR_CMD_1, WR_CMD_2, WR_CMD_3, WR_CMD_4, WR_CMD_5, WR_CMD_6, . . . .

The third synchronization command SYNC_CMD_3 is a command requesting synchronization operation for the first write command WR_CMD_1, the second write command WR_CMD_2, the third write command WR_CMD_3, the fourth write command WR_CMD_4, the fifth write command WR_CMD_5 and the sixth write command WR_CMD_6 among the plurality of write commands WR_CMD_1, WR_CMD_2, WR_CMD_3, WR_CMD_4, WR_CMD_5, WR_CMD_6, . . . .

In the embodiments of the present disclosure, the memory system 100 can manage the plurality of write commands WR_CMD_1, WR_CMD_2, WR_CMD_3, WR_CMD_4, WR_CMD_5, WR_CMD_6, . . . and the plurality of synchronization commands SYNC_CMD_1, SYNC_CMD_2, SYNC_CMD_3, . . . described in FIG. 5 in various ways. Hereinafter, this will be described in detail with reference to FIGS. 6 to 8.

Figure 6:
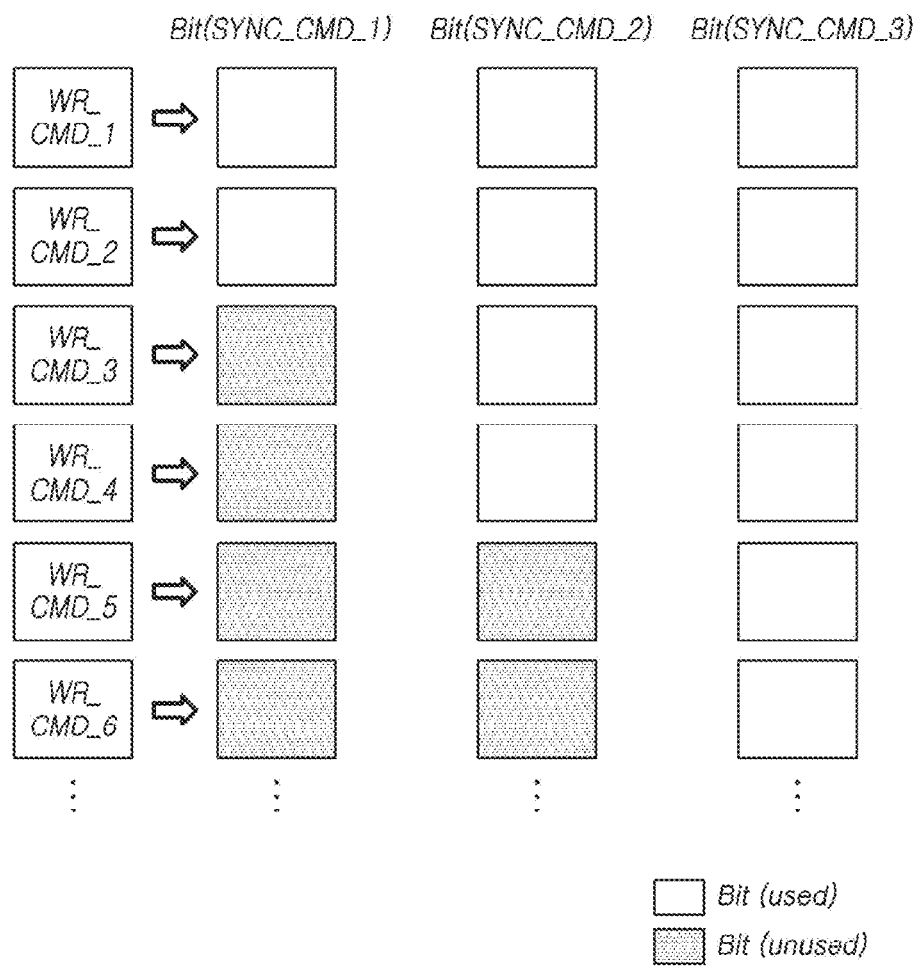
FIG. 6 is a diagram illustrating an example of the memory controller managing the plurality of write commands and the plurality of synchronization commands based on an embodiment of the present disclosure.

FIG. 6 is a diagram illustrating an example of the memory controller 120 managing the plurality of write commands WR_CMD_1, WR_CMD_2, WR_CMD_3, WR_CMD_4, WR_CMD_5, WR_CMD_6, . . . and the plurality of synchronization commands SYNC_CMD_1, SYNC_CMD_2, SYNC_CMD_3, . . . based on an embodiment of the present disclosure.

Referring to FIG. 6, the memory controller 120 of the memory system 110 may manage synchronization commands requesting synchronization operation for each of the plurality of write commands WR_CMD_1, WR_CMD_2, WR_CMD_3, WR_CMD_4, WR_CMD_5, WR_CMD_6, . . . through a bitmap. In this case, each bit of the bitmap may correspond to one of the synchronization commands.

For example, the bitmap corresponding to the first write command WR_CMD_1 may include bits corresponding to the first synchronization command SYNC_CMD_1, the second synchronization command SYNC_CMD_2 and the third synchronization command SYNC_CMD_3. This is because the first synchronization command SYNC_CMD_1, the second synchronization command SYNC_CMD_2 and the third synchronization command SYNC_CMD_3 all request a synchronization operation for the first write command WR_CMD_1.

Similarly, the bitmap corresponding to the second write command WR_CMD_2 may include bits corresponding to the first synchronization command SYNC_CMD_1, the second synchronization command SYNC_CMD_2 and the third synchronization command SYNC_CMD_3.

As another example, the bitmap corresponding to the third write command WR_CMD_3 may include bits corresponding to the second synchronization command SYNC_CMD_2 and the third synchronization command SYNC_CMD_3 but may not include bit corresponding to the first synchronization command SYNC_CMD_1. This is because the second synchronization command SYNC_CMD_2 and the third synchronization command SYNC_CMD_3 request synchronization operation for the third write command WR_CMD_3, and the first synchronization command SYNC_CMD_1 doesn't request synchronization operation for the third write command WR_CMD_3.

Similarly, the bitmap corresponding to the fourth write command WR_CMD_4 may also include bits corresponding to the second synchronization command SYNC_CMD_2 and the third synchronization command SYNC_CMD_3, and may not include bit corresponding to the first synchronization command SYNC_CMD_1.

As another example, the bitmap corresponding to the fifth write command WR_CMD_5 may include bit corresponding to the third synchronization command SYNC_CMD_3 but may not include bits corresponding to the first synchronization command SYNC_CMD_1 and the second synchronization command SYNC_CMD_2. This is because the third synchronization command SYNC_CMD_3 request synchronization operation for the fifth write command WR_CMD_5, and the first synchronization command SYNC_CMD_1 and the second synchronization command SYNC_CMD_2 do not request synchronization operation for the fifth write command WR_CMD_5.

Similarly, the bitmap corresponding to the sixth write command WR_CMD_6 may also include a bit corresponding to the third synchronization command SYNC_CMD_3, and may not include bits corresponding to the first synchronization command SYNC_CMD_1 and the second synchronization command SYNC_CMD_2.

If the plurality of write commands WR_CMD_1, WR_CMD_2, WR_CMD_3, WR_CMD_4, WR_CMD_5, WR_CMD_6, . . . and the plurality of synchronization commands SYNC_CMD_1, SYNC_CMD_2, SYNC_CMD_3, . . . are managed by bitmap, one write command may correspond to multiple synchronization commands. For example, the first write command WR_CMD_1 may overlap the first synchronization command SYNC_CMD_1, the second synchronization command SYNC_CMD_2 and the third synchronization command SYNC_CMD_3.

Accordingly, when the synchronization operation for one write command is completed, the memory controller 120 may check all synchronization commands corresponding to the write command through the bitmap, and clear all bits corresponding to the synchronization commands in the bitmap.

Figure 7:
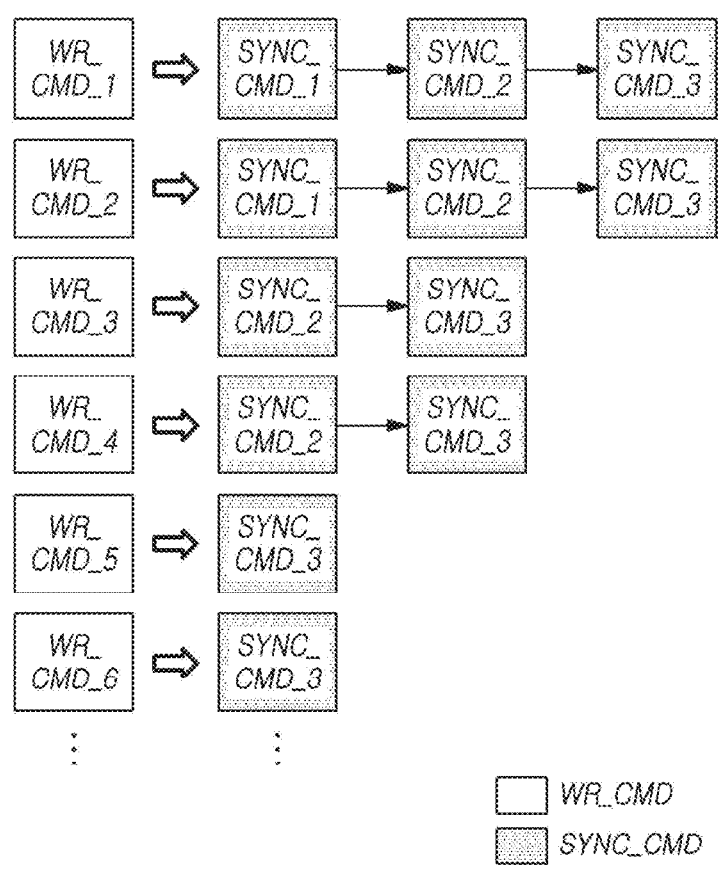
FIG. 7 is a diagram illustrating another example of the memory controller managing the plurality of write commands and the plurality of synchronization commands based on an embodiment of the present disclosure.

FIG. 7 is a diagram illustrating another example of the memory controller 120 managing the plurality of write commands WR_CMD_1, WR_CMD_2, WR_CMD_3, WR_CMD_4, WR_CMD_5, WR_CMD_6, . . . and the plurality of synchronization commands SYNC_CMD_1, SYNC_CMD_2, SYNC_CMD_3, . . . based on an embodiment of the present disclosure.

Referring to FIG. 7, the memory controller 120 of the memory system 110 may manage synchronization commands requesting synchronization operation for each of the plurality of write commands WR_CMD_1, WR_CMD_2, WR_CMD_3, WR_CMD_4, WR_CMD_5, WR_CMD_6, . . . through linked lists.

In FIG. 7, the memory controller 120 may generate different linked lists for each write command.

For example, the memory controller 120 may generate a linked list for the first write command WR_CMD_1. Because the first write command WR_CMD_1 can be synchronized by the first synchronization command SYNC_CMD_1, the second synchronization command SYNC_CMD_2 and the third synchronization command SYNC_CMD_3, the linked list for the first write command WR_CMD_1 may include the first synchronization command SYNC_CMD_1, the second synchronization command SYNC_CMD_2 and the third synchronization command SYNC_CMD_3.

Similarly, the memory controller 120 may generate a linked list for the second write command WR_CMD_2. The linked list for the second write command WR_CMD_2 may also include the first synchronization command SYNC_CMD_1, the second synchronization command SYNC_CMD_2 and the third synchronization command SYNC_CMD_3.

For another example, the memory controller 120 may generate a linked list for the third write command WR_CMD_3. Because the third write command WR_CMD_3 can be synchronized by the second synchronization command SYNC_CMD_2 and the third synchronization command SYNC_CMD_3, the linked list for the third write command WR_CMD_3 may include the second synchronization command SYNC_CMD_2 and the third synchronization command SYNC_CMD_3.

Similarly, the memory controller 120 may generate a linked list for the fourth write command WR_CMD_4. The linked list for the fourth write command WR_CMD_4 may include the second synchronization command SYNC_CMD_2 and the third synchronization command SYNC_CMD_3.

For another example, the memory controller 120 may generate a linked list for the fifth write command WR_CMD_5. Because the fifth write command WR_CMD_5 can be synchronized by the third synchronization command SYNC_CMD_3, the linked list for the fifth write command WR_CMD_5 may include the third synchronization command SYNC_CMD_3.

Similarly, the memory controller 120 may generate a linked list for the sixth write command WR_CMD_6. The linked list for the sixth write command WR_CMD_6 may include the third synchronization command SYNC_CMD_3.

If the plurality of write commands WR_CMD_1, WR_CMD_2, WR_CMD_3, WR_CMD_4, WR_CMD_5, WR_CMD_6, . . . and the plurality of synchronization commands SYNC_CMD_1, SYNC_CMD_2, SYNC_CMD_3, . . . are managed by linked lists, the same synchronization command may exist in duplicate in linked lists.

When the synchronization operation for one write command is completed, the memory controller 120 may search for the synchronization commands corresponding to the write command using the linked list corresponding to the write command. In this case, since the synchronization operation for the write command has been processed, the memory controller 120 may decrease the count of unprocessed write commands with respect to synchronization commands corresponding to the write command. Through this, the memory controller 120 may check whether processing of the plurality of synchronization commands SYNC_CMD_1, SYNC_CMD_2, SYNC_CMD_3, . . . is completed.

Figure 8:
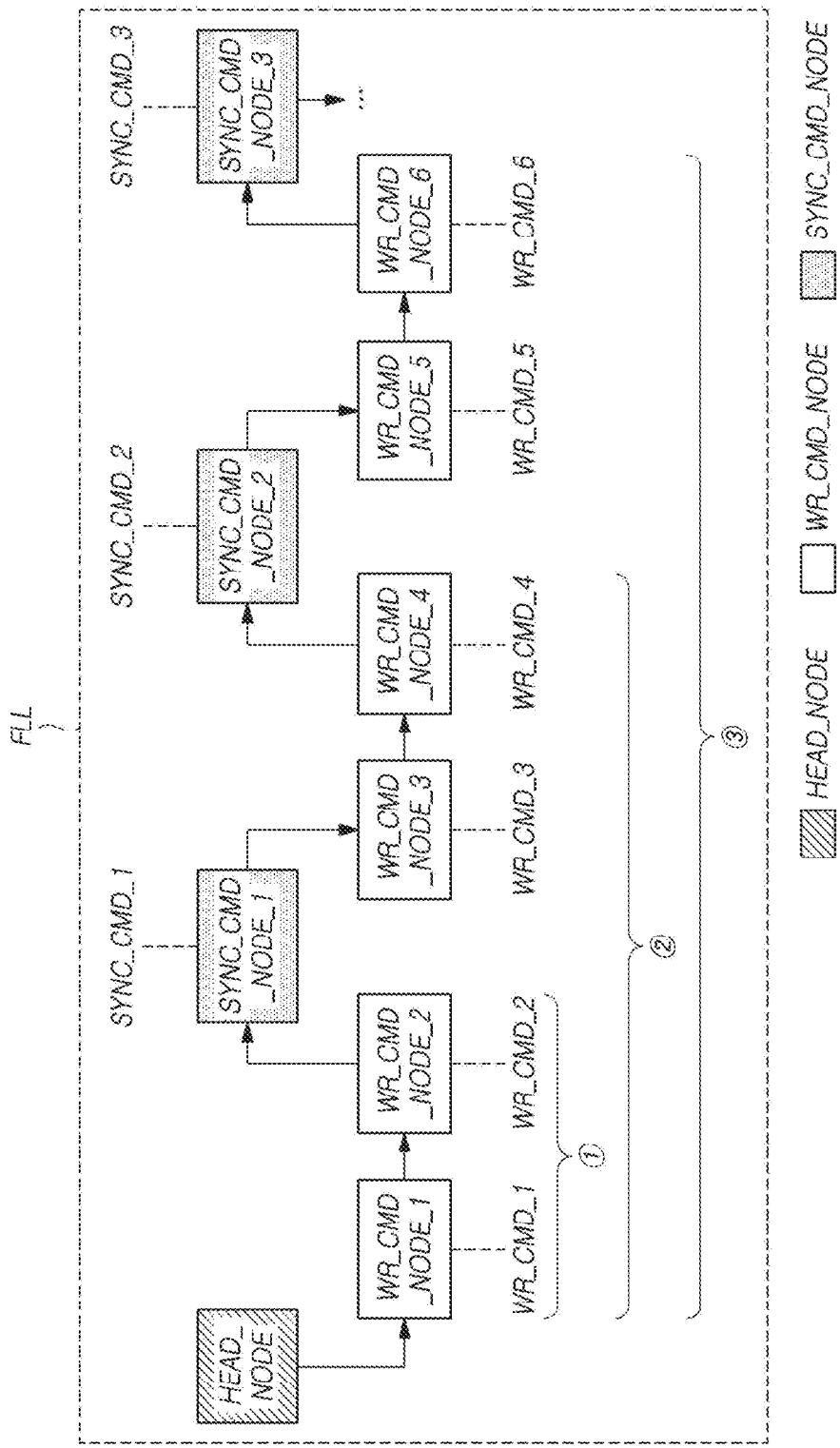
FIG. 8 is a diagram illustrating another example of the memory controller managing the plurality of write commands and the plurality of synchronization commands based on an embodiment of the present disclosure.

FIG. 8 is a diagram illustrating another example of the memory controller 120 managing the plurality of write commands WR_CMD_1, WR_CMD_2, WR_CMD_3, WR_CMD_4, WR_CMD_5, WR_CMD_6, . . . and the plurality of synchronization commands SYNC_CMD_1, SYNC_CMD_2, SYNC_CMD_3, . . . based on an embodiment of the present disclosure.

Referring to FIG. 8, the memory controller 120 of the memory system 100 may generate a fused linked list FLL which includes information of a plurality of write commands WR_CMD_1, WR_CMD_2, WR_CMD_3, WR_CMD_4, WR_CMD_5, WR_CMD_6, . . . and a plurality of synchronization commands SYNC_CMD_1, SYNC_CMD_2, SYNC_CMD_3, . . . .

The memory controller 120 may control a synchronization operation for one or more of the plurality of write commands WR_CMD_1, WR_CMD_2, WR_CMD_3, WR_CMD_4, WR_CMD_5, WR_CMD_6, . . . based on the fused linked list FLL.

The plurality of write commands WR_CMD_1, WR_CMD_2, WR_CMD_3, WR_CMD_4, WR_CMD_5, WR_CMD_6, . . . and the plurality of synchronization commands SYNC_CMD_1, SYNC_CMD_2, SYNC_CMD_3, . . . are all managed by the fused linked list FLL. Accordingly, a case in which each of the plurality of synchronization commands SYNC_CMD_1, SYNC_CMD_2, SYNC_CMD_3, . . . is managed in different linked lists, as shown in FIG. 7, does not occur.

Referring to FIG. 8, the fused linked list FLL may include i) a head node HEAD_NODE indicating the start position of the fused linked list FLL, ii) a plurality of write commands node WR_CMD_NODE each of which corresponds to one of the plurality of write commands WR_CMD_1, WR_CMD_2, WR_CMD_3, WR_CMD_4, WR_CMD_5, WR_CMD_6, . . . , and iii) a plurality of synchronization command nodes SYNC_CMD_NODE each of which corresponds to one of the plurality of synchronization commands SYNC_CMD_1, SYNC_CMD_2, SYNC_CMD_3, . . . .

The head node HEAD_NODE, the plurality of write command nodes WR_CMD_NODE and the plurality of synchronization command nodes SYNC_CMD_NODE are types of nodes included in the fused linked list FLL. Each node included in the fused linked list FLL may include a pointer indicating a node located next to the node in the fused linked list FLL.

The memory controller 120 may traverse the fused linked list FLL through a path defined by the pointers included in respective nodes included in the fused linked list FLL. After accessing a particular node in the fused linked list FLL, the memory controller 120 may access a subsequent node indicated by a pointer of the particular node. In the fused linked list FLL, the memory controller 120 may traverse any path defined by two nodes through the pointers of nodes included in the path.

The head node HEAD_NODE is a node that exists from the beginning when the fused linked list FLL is generated, and may not correspond to any command. When a new node is added to the fused linked list FLL, the new node may be added as a next node of the head node HEAD_NODE. That is, the pointer of the head node HEAD_NODE may indicate the new node.

Moreover, each of the plurality of synchronization command nodes SYNC_CMD_NODE may further include information on one or more write commands which are to be synchronized by the corresponding synchronization command.

In this case, the write command node WR_CMD_NODE corresponding to one of the write commands to be synchronized by the first target synchronization command, which is one of the plurality of synchronization commands SYNC_CMD_1, SYNC_CMD_2, SYNC_CMD_3, . . . , may be located between i) the head node HEAD_NODE and ii) the synchronization command node SYNC_CMD_NODE corresponding to the first target synchronization command.

When traversing the path defined by the pointers of nodes from i) the head node HEAD_NODE to ii) the synchronization command node SYNC_CMD_NODE corresponding to the first target synchronization command, the memory controller 120 may access the write command node WR_CMD_NODE before accessing the synchronization command node SYNC_CMD_NODE corresponding to the first target synchronization command.

In this case, the memory controller 120 may access the write command node WR_CMD_NODE by traversing the path from the head node HEAD_NODE to the synchronization command node SYNC_CMD_NODE corresponding to the first target synchronization command.

For example, when the first target synchronization command is the first synchronization command SYNC_CMD_1, the write command node WR_CMD_NODE_1 corresponding to the first write command WR_CMD_1 and the write command node WR_CMD_NODE_2 corresponding to the second write command WR_CMD_2 are located between the head node HEAD_NODE and the synchronization command node corresponding to the first synchronization command SYNC_CMD_1 "①", wherein the first write command WR_CMD_1 and the second write command WR_CMD_2 are to be synchronized by the first synchronization command SYNC_CMD_1.

For another example, when the first target synchronization command is the second synchronization command SYNC_CMD_2, the write command node WR_CMD_NODE_1 corresponding to the first write command WR_CMD_1, the write command node WR_CMD_NODE_2 corresponding to the second write command WR_CMD_2, the write command node WR_CMD_NODE_3 corresponding to the third write command WR_CMD_3 and the write command node WR_CMD_NODE_4 corresponding to the fourth write command WR_CMD_4 are located between the head node HEAD_NODE and the synchronization command node corresponding to the second synchronization command SYNC_CMD_2 "②", wherein the first write command WR_CMD_1, the second write command WR_CMD_2, the third write command WR_CMD_3 and the fourth write command WR_CMD_4 are to be synchronized by the second synchronization command SYNC_CMD_2.

For another example, when the first target synchronization command is the third synchronization command SYNC_CMD_3, the write command node WR_CMD_NODE_1 corresponding to the first write command WR_CMD_1, the write command node WR_CMD_NODE_2 corresponding to the second write command WR_CMD_2, the write command node WR_CMD_NODE_3 corresponding to the third write command WR_CMD_3, the write command node WR_CMD_NODE_4 corresponding to the fourth write command WR_CMD_4, the write command node WR_CMD_NODE_5 corresponding to the fifth write command WR_CMD_5 and the write command node WR_CMD_NODE_6 corresponding to the sixth write command WR_CMD_6 are located between the head node HEAD_NODE and the synchronization command node corresponding to the third synchronization command SYNC_CMD_3 "③", wherein the first write command WR_CMD_1, the second write command WR_CMD_2, the third write command WR_CMD_3, the fourth write command WR_CMD_4, the fifth write command WR_CMD_5 and the sixth write command WR_CMD_6 are to be synchronized by the third synchronization command SYNC_CMD_3.

By managing the plurality of write commands WR_CMD_1, WR_CMD_2, WR_CMD_3, WR_CMD_4, WR_CMD_5, WR_CMD_6, . . . and the plurality of synchronization commands SYNC_CMD_1, SYNC_CMD_2, SYNC_CMD_3, . . . by the fused linked list FLL, it is possible to prevent the information on the synchronization command from being overlapped for each write command. Through this, the memory controller 120 may efficiently manage the plurality of write commands WR_CMD_1, WR_CMD_2, WR_CMD_3, WR_CMD_4, WR_CMD_5, WR_CMD_6, . . . and the plurality of synchronization commands SYNC_CMD_1, SYNC_CMD_2, SYNC_CMD_3, . . . received from the host HOST.

Moreover, the memory controller 120 may control the fused linked list FLL for the write command node WR_CMD_NODE, which corresponds to the write command that is not to be synchronized by the first target synchronization command but to be synchronized by the second target synchronization command, to be located between i) synchronization command node corresponding to the first target synchronization command and ii) synchronization command node corresponding to the second target synchronization command.

That is, the memory controller 120 may access the write command node corresponding to write command that is not to be synchronized by the first target synchronization command but to be synchronized by the second target synchronization command by traversing a path defined by the pointers of the nodes from the synchronization command node corresponding to the first target synchronization command to the synchronization command node corresponding to the second target synchronization command.

For example, when the first target synchronization command is the first synchronization command SYNC_CMD_1 and the second target synchronization command is the second synchronization command SYNC_CMD_2, write commands that are not to be synchronized by the first synchronization command SYNC_CMD_1 but to be synchronized by the second synchronization command SYNC_CMD_2 are the third write command WR_CMD_3 and fourth write command WR_CMD_4.

Referring to FIG. 8, the third write command node WR_CMD_NODE_3 corresponding to the third write command WR_CMD_3 and the fourth write command node WR_CMD_NODE_4 corresponding to the fourth write command WR_CMD_4 may be located between the synchronization command node SYNC_CMD_NODE_1 corresponding to the first synchronization command SYNC_CMD_1 and the synchronization command node SYNC_CMD_NODE_2 corresponding to the second synchronization command SYNC_CMD_2.

In this case, the synchronization command node corresponding to the first target synchronization command may be located between the head node HEAD_NODE and the synchronization command node corresponding to the second target synchronization command.

That is, the memory controller 120 may access the synchronization command node corresponding to the first target synchronization command by traversing a path defined by the pointers of the nodes from the head node HEAD_NODE to the synchronization command node corresponding to the second target synchronization command.

For example, when the first target synchronization command is the first synchronization command SYNC_CMD_1 and the second target synchronization command is the second synchronization command SYNC_CMD_2, the synchronization command node SYNC_CMD_NODE_1 corresponding to the first synchronization command SYNC_CMD_1 may be located between the head node HEAD_NODE and the synchronization command node SYNC_CMD_NODE_2 corresponding to the second synchronization command SYNC_CMD_2.

Furthermore, the fused linked list FLL may be stored, for example, in the working memory 125 in the memory controller 120.

Moreover, the operation of the memory controller 120 to control the fused linked list FLL may be executed, for example, by the processor 124 in the memory controller 120.

In FIG. 8, the fused linked list FLL is implemented as a single linked list. But the fused linked list FLL may be implemented as different type of linked list.

Figure 9:
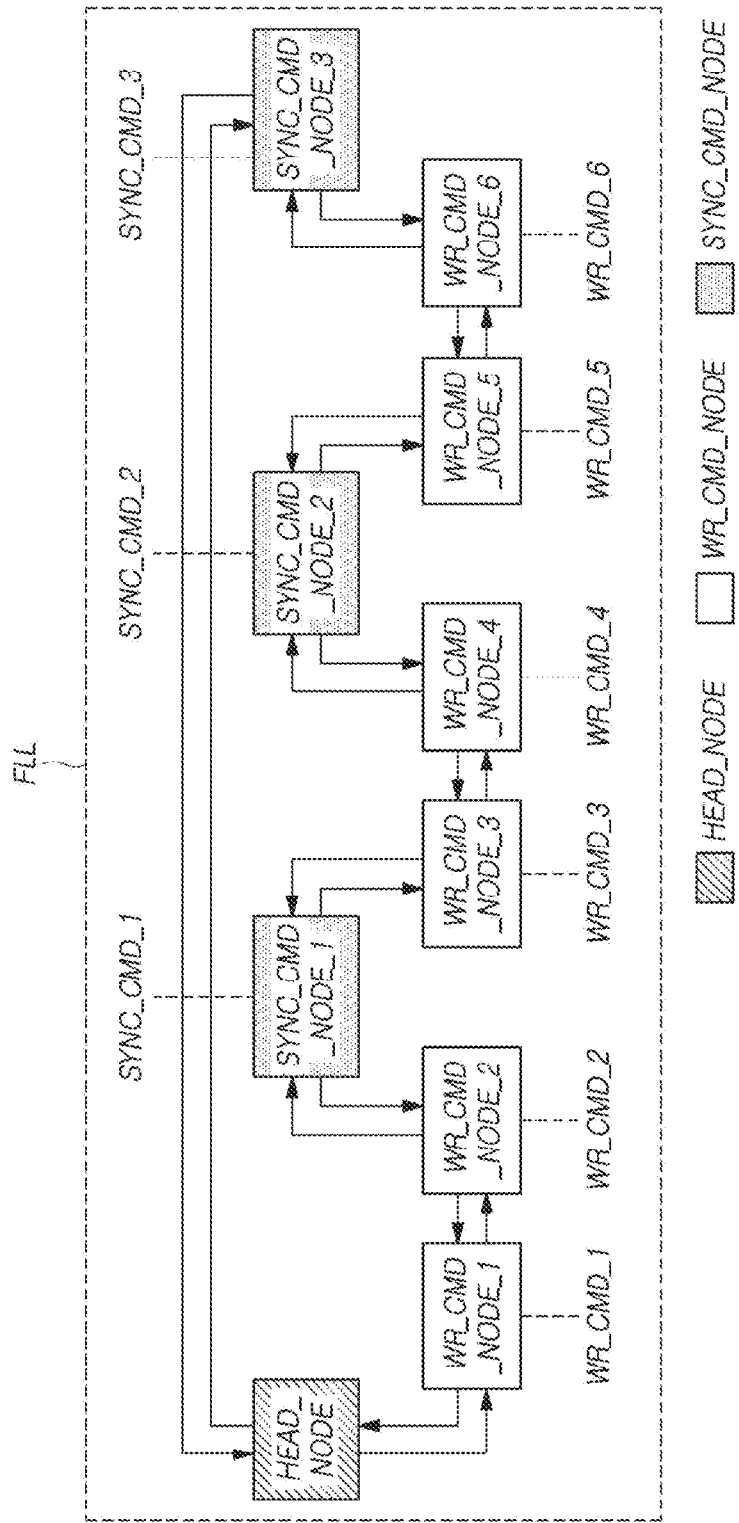
FIG. 9 is a diagram illustrating another method of implementing the fused linked list described in FIG. 8 based on an embodiment of the present disclosure.

FIG. 9 is a diagram illustrating another method of implementing the fused linked list FLL described in FIG. 8 based on an embodiment of the present disclosure.

Referring to FIG. 9, the fused linked list FLL may be a double linked list. That is, each node included in the fused linked list FLL may include not only a pointer indicating a next node to itself but also a pointer indicating a previous node to itself in the fused linked list FLL. According to the double linked list of FIG. 9, the memory controller 120 may traverse the fused linked list FLL backward through the pointers of a single particular node that indicate previous nodes of the particular node and forward through the pointers of a single particular node that indicate subsequent nodes of the particular node.

For example, the memory controller 120 may determine that, by using the pointer indicating a previous node of the synchronization command node SYNC_CMD_NODE_1 corresponding to the first synchronization command SYNC_CMD_1, the previous node of the synchronization command node SYNC_CMD_NODE_1 is the write command node WR_CMD_NODE_2 corresponding to the second write command WR_CMD_2.

Furthermore, when the fused linked list FLL is a double linked list, the pointer indicating the subsequent node of the last node of the fused linked list FLL may indicate the head node HEAD_NODE, and the pointer indicating the previous node of the head node HEAD_NODE may indicate the last node of the fused linked list FLL. Accordingly, the memory controller 120 may access the last node of the fused linked list FLL using a pointer indicating a previous node of the head node HEAD_NODE.

In FIG. 9, the type of the last node of the fused linked list FLL is a synchronization command node, however, the type of the last node of the fused linked list FLL may be a write command node.

FIG. 10 to FIG. 13 are diagrams illustrating a process in which the fused linked list FLL described in FIG. 8 changes as a synchronization operation proceeds based on an embodiment of the present disclosure.

In the embodiments of the present disclosure, the memory controller 120 of the memory system 100 may remove the target write command node, which is a write command node located between the synchronization command node corresponding to the first target synchronization command and the synchronization command node corresponding to the second target synchronization command, after the synchronization operation for the target write command node is completed.

The write command node between the synchronization command node corresponding to the first target synchronization command and the synchronization command node corresponding to the second target synchronization command is located on a path defined by the pointers of nodes from the synchronization command node corresponding to the first target synchronization command to the synchronization command node corresponding to the second target synchronization command.

The memory controller 120 may traverse the fused linked list FLL starting with the head node HEAD_NODE, to access the target write command node in the fused linked list FLL.

After the synchronization-completed target write command node is removed from the fused linked list FLL, the memory controller 120 may remove the synchronization command node corresponding to the first target synchronization command from the fused linked list FLL when there is no write command node between the head node HEAD_NODE and the synchronization command node corresponding to the first target synchronization command.

Hereinafter, as an example, the first target synchronization command is the first synchronization command SYNC_CMD_1 and the second target synchronization command is the second synchronization command SYNC_CMD_2.

Figure 10:
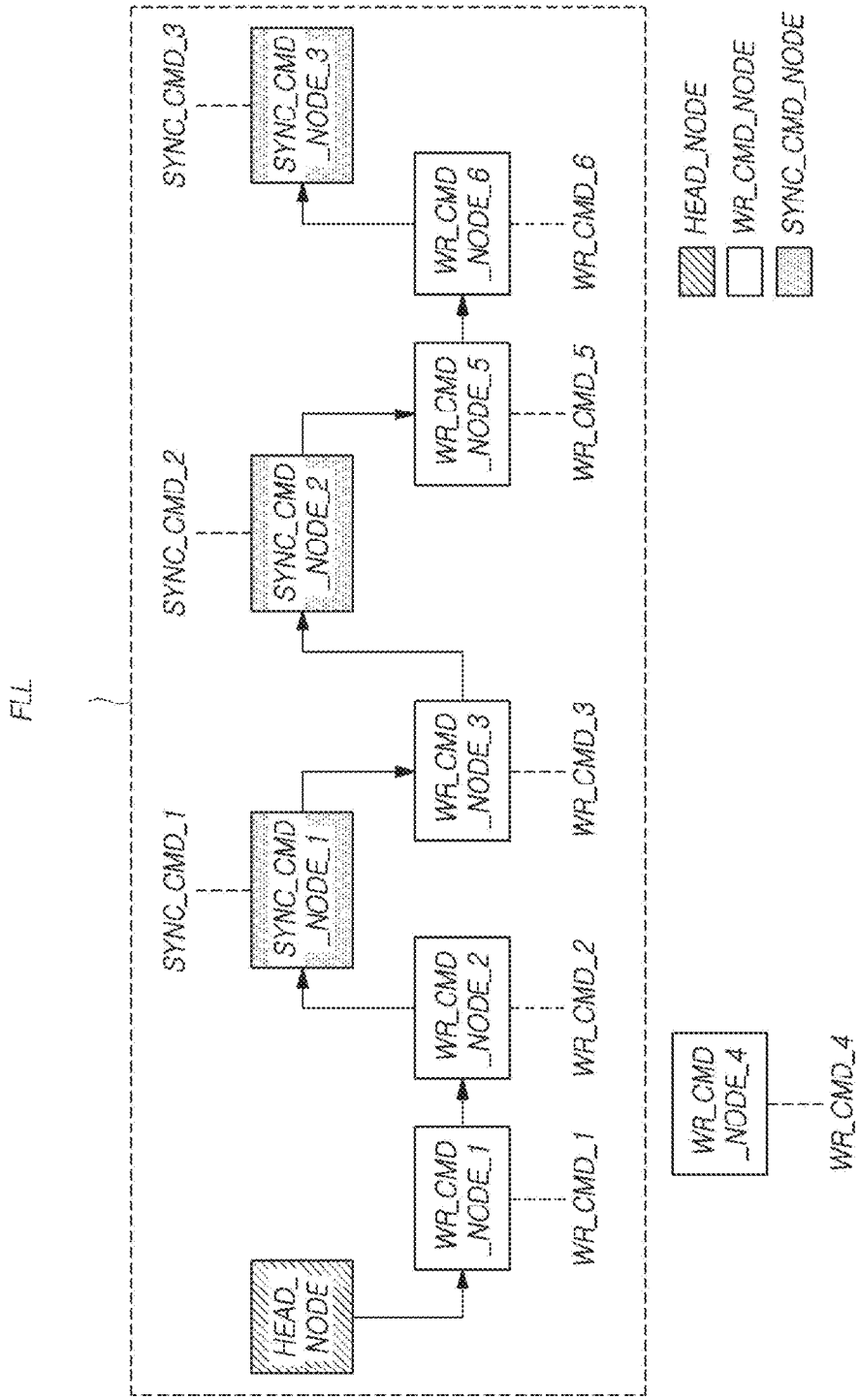
FIG. 10 to FIG. 13 are diagrams illustrating a process in which the fused linked list described in FIG. 8 changes as a synchronization operation proceeds based on an embodiment of the present disclosure.

In FIG. 10, a synchronization operation for the fourth write command WR_CMD_4 is performed. When the synchronization operation for the fourth write command WR_CMD_4 is completed, the memory controller 120 may remove the write command node WR_CMD_NODE_4 corresponding to the fourth write command WR_CMD_4 from the fused linked list FLL. In this case, the memory controller 120 may control the pointer of the write command node WR_CMD_NODE_3 corresponding to the third write command WR_CMD_3 to indicate, as the subsequent node of the write command node WR_CMD_NODE_3, the synchronization command node SYNC_CMD_NODE_2 corresponding to the second synchronization command SYNC_CMD_2.

Figure 11:
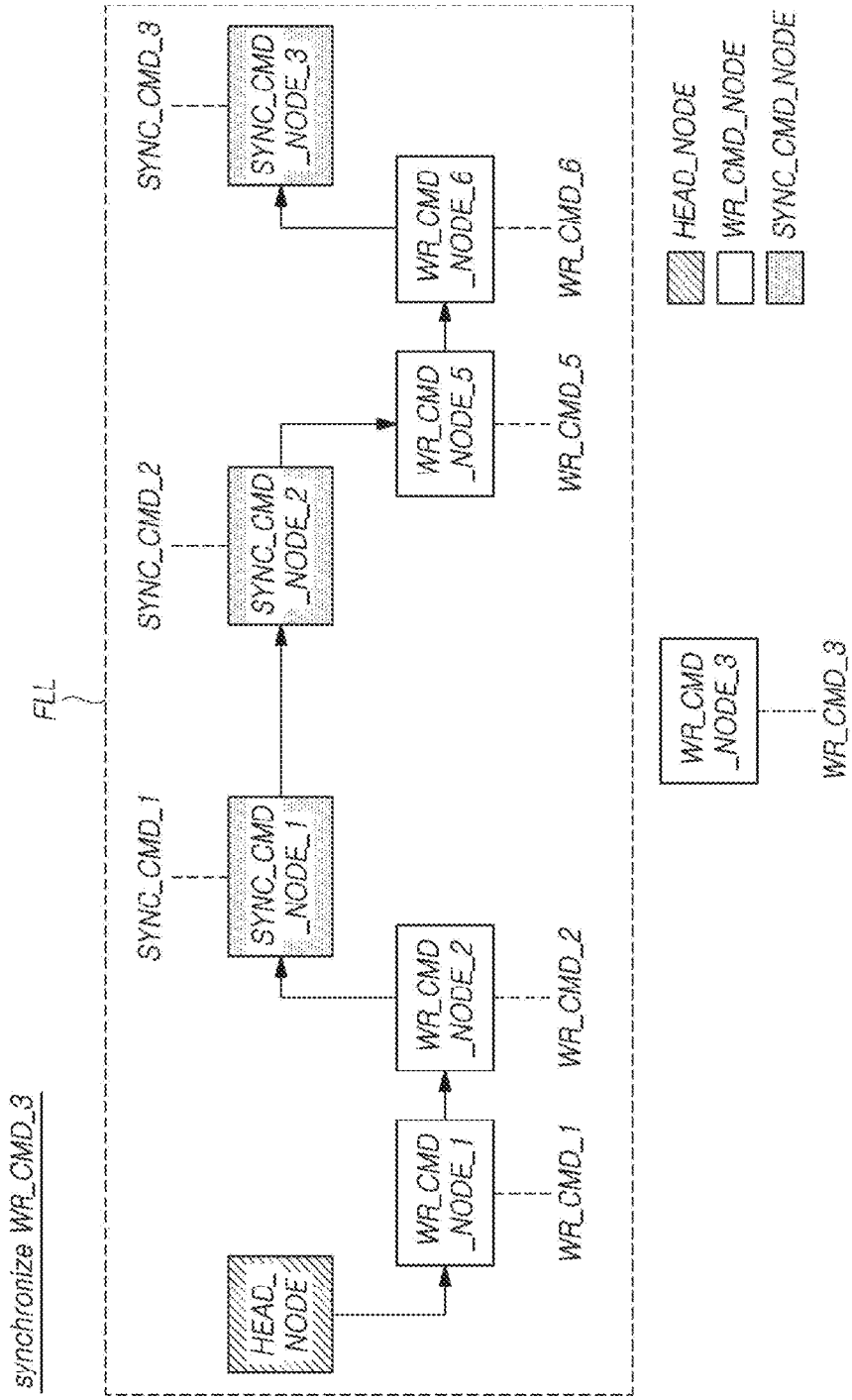

In FIG. 11, a synchronization operation for the third write command WR_CMD_3 is additionally performed. When the synchronization operation for the third write command WR_CMD_3 is completed, the memory controller 120 may remove the write command node WR_CMD_NODE_3 corresponding to the third write command WR_CMD_3 from the fused linked list FLL. In this case, the memory controller 120 may control the pointer of the synchronization command node SYNC_CMD_NODE_1 corresponding to the first synchronization command SYNC_CMD_1 to indicate, as the subsequent node of the synchronization command node SYNC_CMD_NODE_1, the synchronization command node SYNC_CMD_NODE_2 corresponding to the second synchronization command SYNC_CMD_2.

In this case, there is no write command node between the synchronization command node SYNC_CMD_NODE_1 corresponding to the first synchronization command SYNC_CMD_1 and the synchronization command node SYNC_CMD_NODE_2 corresponding to the second synchronization command SYNC_CMD_2. This means that synchronization operations for all write commands which are not to be synchronized by the first synchronization command SYNC_CMD_1 but are to be synchronized by the second synchronization command SYNC_CMD_2 have been completed.

Figure 12:
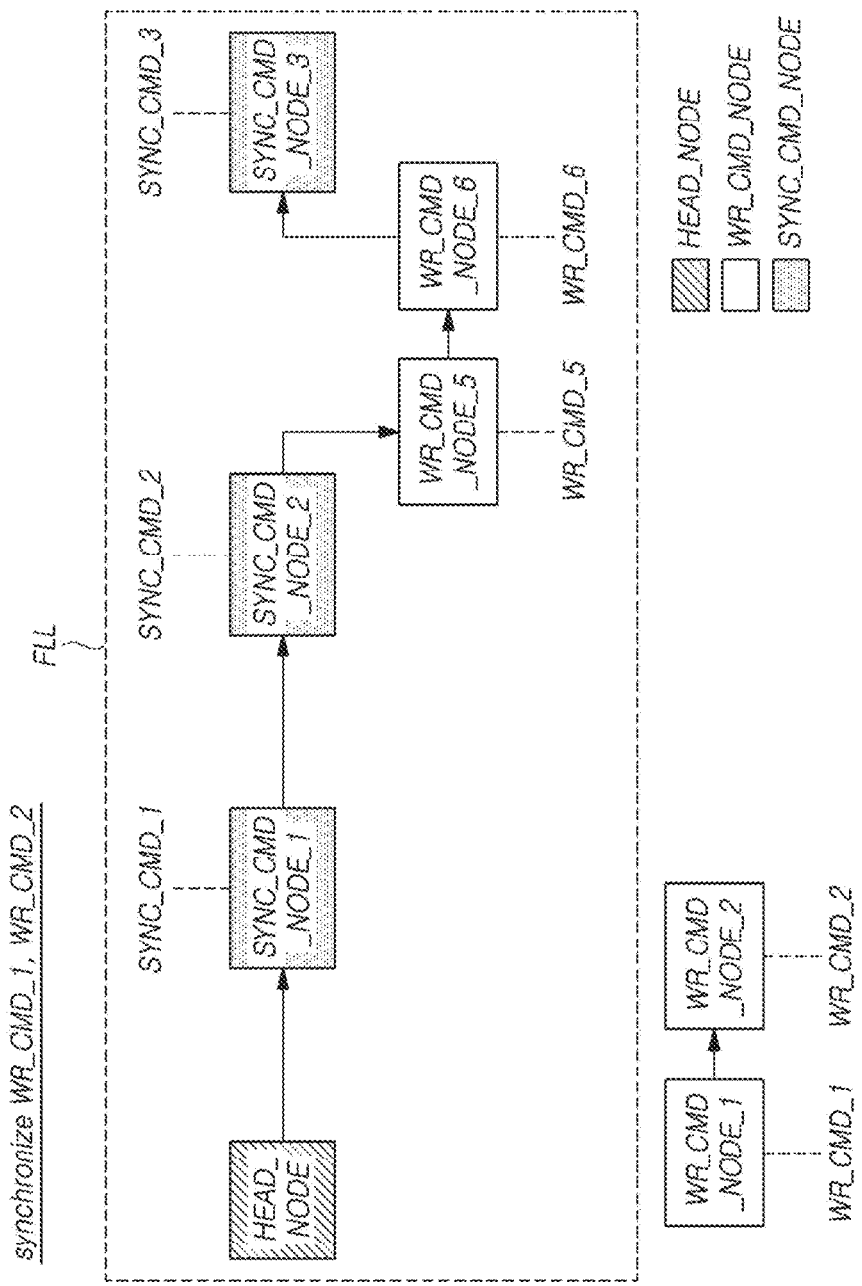

In FIG. 12, a synchronization operation for the first write command WR_CMD_1 and the second write command WR_CMD_2 is additionally performed. When the synchronization operation for the first write command WR_CMD_1 and the second write command WR_CMD_2 are completed, the memory controller 120 may remove the write command node WR_CMD_NODE_1 corresponding to the first write command WR_CMD_1 and the write command node WR_CMD_NODE_2 corresponding to the second write command WR_CMD_2 from the fused linked list FLL. In this case, the memory controller 120 may control the pointer of the head node HEAD_NODE to indicate, as the subsequent node of the head node HEAD_NODE, the synchronization command node SYNC_CMD_NODE_1 corresponding to the first synchronization command SYNC_CMD_1.

In this case, there is no write command node between the head node HEAD_NODE and the synchronization command node SYNC_CMD_NODE_1 corresponding to the first synchronization command SYNC_CMD_1. That is, there is no write command node located on a path defined from the head node HEAD_NODE to the synchronization command node SYNC_CMD_NODE_1 corresponding to the first synchronization command SYNC_CMD_1.

This means that synchronization operations for all the write commands to be synchronized by the first synchronization command SYNC_CMD_1 have been completed.

Figure 13:
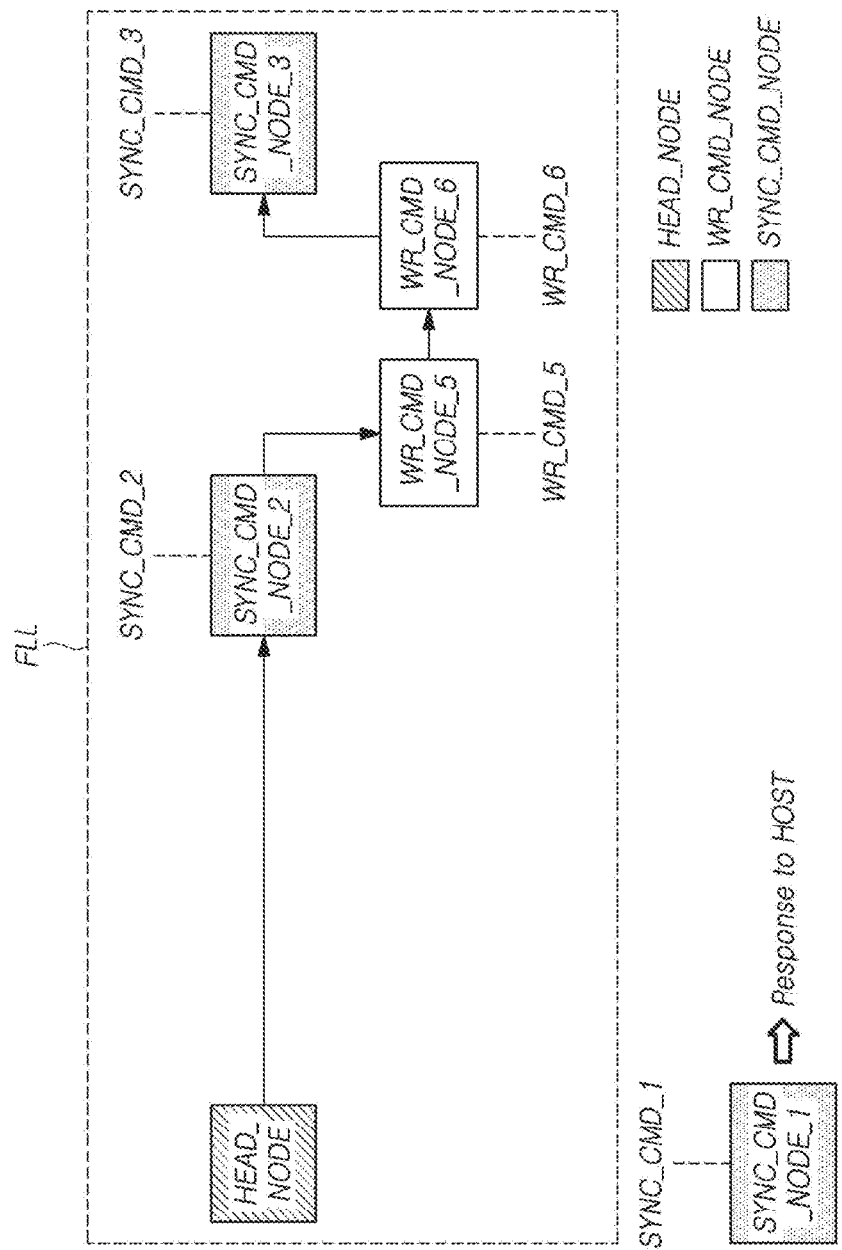

Referring to FIG. 13, because there is no write command node between the head node HEAD_NODE and the synchronization command node SYNC_CMD_NODE_1 corresponding to the first synchronization command SYNC_CMD_1, the memory controller 120 may remove the synchronization command node SYNC_CMD_NODE_1 corresponding to the first synchronization command SYNC_CMD_1 from the fused linked list FLL.

In this case, because synchronization operations for all write commands to be synchronized by the first synchronization command SYNC_CMD_1 have been finished, the memory controller 120 may transmit a response to the first synchronization command SYNC_CMD_1 to the host HOST.

Figure 14:
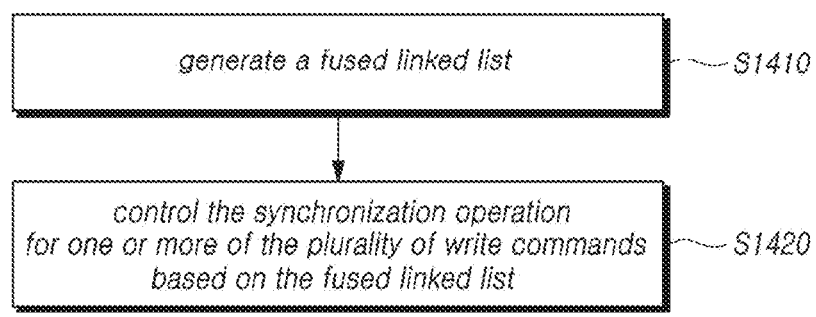
FIG. 14 is a diagram illustrating a method for operating the memory controller based on an embodiment of the present disclosure.

FIG. 14 is a diagram illustrating a method for operating the memory controller 120 based on an embodiment of the present disclosure.

Referring to FIG. 14, a method for operating the memory controller 120 may include generating a fused linked list FLL which includes information of i) a plurality of write commands WR_CMD received from the host HOST and ii) a plurality of synchronization commands SYNC_CMD requesting a synchronization operation, wherein the synchronization operation is an operation completing storage of data requested to be written by one or more of the plurality of write commands WR_CMD in a memory device 110 (S1410). Additionally, the fused linked list FLL may be, for example, a double linked list.

The method for operating the memory controller 120 May include controlling the synchronization operation for one or more of the plurality of write commands WR_CMD based on the fused linked list FLL (S1420).

The fused linked list FLL may include i) a head node HEAD_NODE indicating the start position of the fused linked list, ii) a plurality of write command nodes WR_CMD_NODE each of which corresponds to one of the plurality of write commands and iii) a plurality of synchronization command nodes SYNC_CMD_NODE each of which corresponds to one of the plurality of synchronization commands.

The memory controller 120 may access a first write command node, which corresponds to one of write commands WR_CMD that are to be synchronized by a first target synchronization command among the plurality of synchronization commands SYNC_CMD, by traversing, within the fused linked list FLL, a path defined by pointers of nodes from the head node HEAD_NODE to a first target synchronization command node, which corresponds to the first target synchronization command.

The memory controller 120 may access a second write command node, which corresponds to one of write commands WR_CMD that are not to be synchronized by the first target synchronization command but are to be synchronized by a second target synchronization command among the plurality of synchronization commands SYNC_CMD, by traversing a path defined by pointers of nodes from the first target synchronization command node to a second target synchronization command node, which corresponds to the second target synchronization command.

In this case, the memory controller 120 may access the first target synchronization command node by traversing a path defined by the pointers of the nodes from the head node HEAD_NODE to the second target synchronization commands node.

When the synchronization operation is completed for a target write command node located on a path defined by the pointers of the node from the first target synchronization command node to the second target synchronization command node, the target write command node may be removed from the fused linked list FLL.

The first target synchronization command node may be removed from the fused linked list FLL, when there is no write command node located on a path defined by the pointers of the nodes from the head node to the first target synchronization command node.

Figure 15:
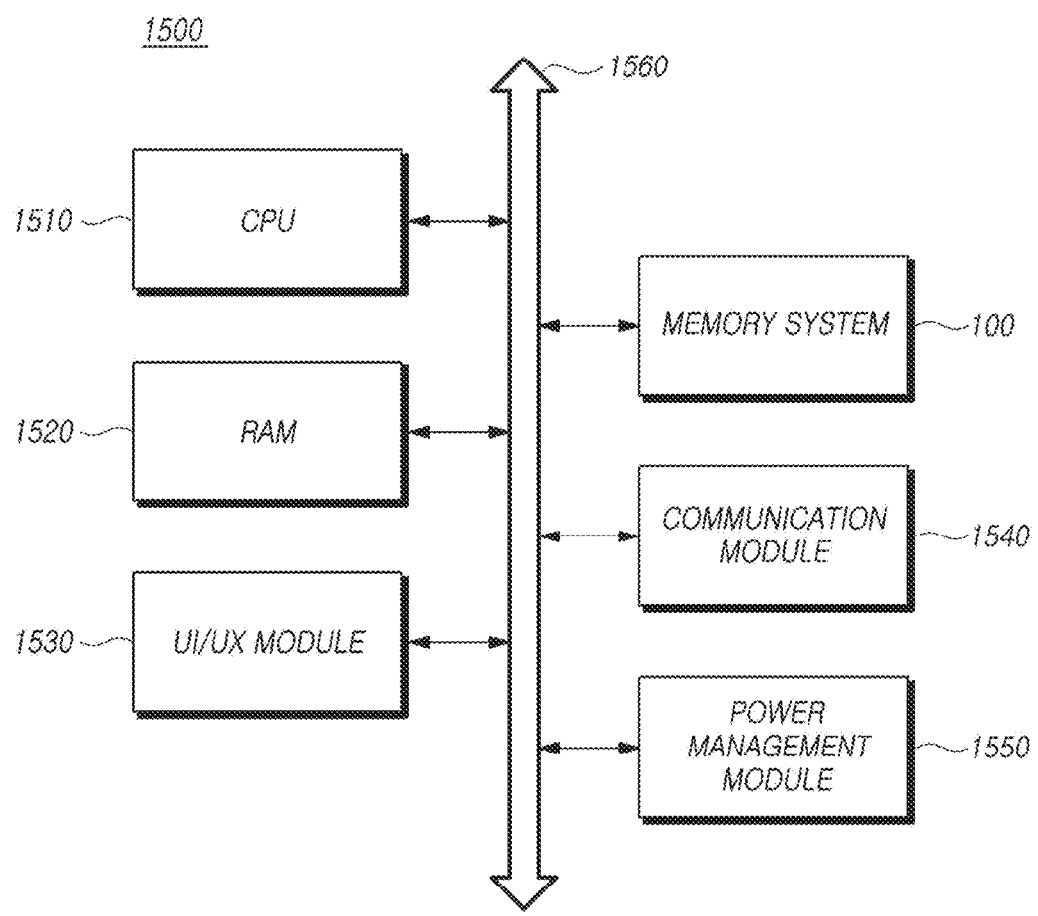
FIG. 15 is a diagram illustrating the configuration of a computing system based on various embodiments of the present disclosure.

FIG. 15 is a diagram illustrating the configuration of a computing system 1500 based on an embodiment of the present disclosure.

Referring to FIG. 15, the computing system 1500 based on an embodiment of the present disclosure may include: a memory system 100 electrically connected to a system bus 1560; a central processing unit (CPU) 1510 configured to control the overall operation of the computing system 1500; a random access memory (RAM) 1520 configured to store data and information related to operations of the computing system 1500; a user interface/user experience (UI/UX) module 1530 configured to provide the user with a user environment; a communication module 1540 configured to communicate with an external device as a wired and/or wireless type; and a power management module 1550 configured to manage power used by the computing system 1500.

The computing system 1500 may be a personal computer (PC) or may include a mobile terminal such as a smartphone, a tablet or various electronic devices.

The computing system 1500 may further include a battery for supplying an operating voltage, and may further include an application chipset, a graphic-related module, a camera image processor, and a dynamic random access memory (DRAM). Other elements would be apparent to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the present disclosure described above, the operation delay time of the memory system may be advantageously reduced or minimized. In addition, based on an embodiment of the present disclosure, an overhead occurring in the process of calling a specific function may be advantageously reduced or minimized. Although various embodiments of the present disclosure have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims. Furthermore, the embodiments may be combined to form additional embodiments.

What is claimed is:

1. A memory controller, comprising:
   generating a fused linked list which includes information of a plurality of write commands received from a host and a plurality of synchronization commands requesting a synchronization operation, wherein the synchronization operation is an operation for completing storage of data in a memory device, the data being requested to be written by one or more of the plurality of write commands, and
   controlling the synchronization operation for one or more of the plurality of write commands based on the fused linked list, wherein the fused linked list includes a head node indicating a start position of the fused linked list, a plurality of write command nodes each of which corresponds to one of the plurality of write commands and a plurality of synchronization command nodes each of which corresponds to one of the plurality of synchronization commands, wherein a target write command node, among the plurality of write command nodes, is removed from the fused linked list after synchronization operation for the target write command node is completed, wherein the target write command node is located between the head node and a first synchronization command node, and wherein the first synchronization command node is selected from among the plurality of synchronization command nodes.

2. The memory controller according to claim 1, wherein the fused linked list is a double linked list.

3. The memory controller according to claim 1, further comprising accessing, within the fused linked list, the target write command node by traversing a path defined by pointers of nodes from the head node to the first synchronization command node.

4. The memory controller according to claim 3, further comprising accessing, within the fused linked list, the target write command node by traversing a path defined by pointers of nodes from a second synchronization command node to the first synchronization command node, wherein the second synchronization command node is selected from among the plurality of synchronization command nodes, wherein the second synchronization command node is located between the head node and the first synchronization command node, and wherein write command corresponding to the target write command node is not to be synchronized by synchronization command corresponding to the second synchronization command node.

5. The memory controller according to claim 4, further comprising accessing, within the fused linked list, the second synchronization command node by traversing a path defined by pointers of nodes from the head node to the first synchronization command node.

6. The memory controller according to claim 1, further comprising removing, from the fused linked list, the first synchronization command node when there is no write command node located on the path defined by the pointers of nodes from the head node to the first synchronization command node.

7. A method for operating a memory controller, the method comprising:

generating a fused linked list which includes information of a plurality of write commands received from a host and a plurality of synchronization commands requesting a synchronization operation, wherein the synchronization operation is an operation of completing storage of data in a memory device, the data being requested to be written by one or more of the plurality of write commands, and controlling the synchronization operation for one or more of the plurality of write commands based on the fused linked list, wherein the fused linked list includes a head node indicating a start position of the fused linked list, a plurality of write command nodes each of which corresponds to one of the plurality of write commands and a plurality of synchronization command nodes each of which corresponds to one of the plurality of synchronization commands, wherein a target write command node, among the plurality of write command nodes, is removed from the fused linked list after synchronization operation for the target write command node is completed, wherein the target write command node is located between the head node and a first synchronization command node, wherein the first synchronization command node is selected from among the plurality of synchronization command nodes.

8. The method according to claim 7, wherein the fused linked list is a double linked list.

9. The method according to claim 7, further comprising accessing, within the fused linked list, the target write command node by traversing a path defined by pointers of nodes from the head node to the first target synchronization command node.

10. The method according to claim 9, further comprising accessing, within the fused linked list, the target write command node by traversing a path defined by pointers of nodes from a second synchronization command node to the first synchronization command node, wherein the second synchronization command node is selected from among the plurality of synchronization command nodes, wherein the second synchronization command node is located between the head node and the first synchronization command node, and wherein write command corresponding to the target write command node is not to be synchronized by synchronization command corresponding to the second synchronization command node.

11. The method according to claim 10, further comprising accessing, within the fused linked list, the second synchronization command node by traversing a path defined by pointers of nodes from the head node to the first target synchronization command node.

12. The method according to claim 7, further comprising removing, from the fused linked list, the first synchronization command node when there is no write command node located on the path defined by the pointers of nodes from the head node to the first synchronization command node.

\* \* \* \* \*